United States Patent
Konttori et al.

(10) Patent No.: US 10,021,281 B2
(45) Date of Patent: Jul. 10, 2018

(54) DEVICE WITH SPLIT IMAGING SYSTEM

(71) Applicant: Microsoft Technology Licensing, LLC, Redmond, WA (US)

(72) Inventors: Urho Konttori, Helsinki (FI); Eero Tuulos, Ylöjärvi (FI); Otto Huittinen, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 15/175,002

(22) Filed: Jun. 6, 2016

(65) Prior Publication Data
US 2017/0353638 A1 Dec. 7, 2017

(51) Int. Cl.
| | |
|---|---|
| *H04N 5/225* | (2006.01) |
| *G03G 7/00* | (2006.01) |
| *G03B 7/00* | (2014.01) |
| *G03B 11/04* | (2006.01) |
| *G03B 17/00* | (2006.01) |
| *G02B 13/00* | (2006.01) |
| *G02B 15/02* | (2006.01) |
| *G02B 27/00* | (2006.01) |
| *G02B 7/08* | (2006.01) |

(52) U.S. Cl.
CPC ......... *H04N 5/2254* (2013.01); *G02B 13/001* (2013.01); *G02B 15/02* (2013.01); *G02B 27/0006* (2013.01); *G03B 7/00* (2013.01); *G03B 11/04* (2013.01); *G03B 17/00* (2013.01); *H04N 5/2252* (2013.01); *H04N 5/2253* (2013.01); *G02B 7/08* (2013.01)

(58) Field of Classification Search
CPC .. H04N 5/2254; H04N 5/2253; H04N 5/2252; G02B 13/001; G02B 15/02; G02B 27/0006; G02B 7/08; G03B 17/00; G03B 7/00; G03B 11/04
See application file for complete search history.

(56) References Cited

U.S. PATENT DOCUMENTS

| | | | |
|---|---|---|---|
| 6,172,709 B1 | 1/2001 | Yamano et al. | |
| 6,940,891 B2 | 9/2005 | Clary et al. | |
| 7,654,755 B2 | 2/2010 | Orf et al. | |
| 8,610,822 B2 | 12/2013 | Weber et al. | |

(Continued)

OTHER PUBLICATIONS

"International Search Report and Written Opinion Issued in PCT Application No. PCT/US2017/034357", dated Jul. 31, 2017, 11 Pages.

(Continued)

*Primary Examiner* — Mekonnen Dagnew (57) ABSTRACT

A device comprising at least two body sections is disclosed. The first body section comprises an imaging unit and a magnet movably connected to the imaging unit, and the second body section comprising an optical unit with a magnet fixed to the optical unit. The magnet movably connected to the imaging unit may be sliding along a guiding element. The body sections are also in a movable connection with each other, and the device is operable in at least two modes. In the first mode the imaging unit and the optical unit are fixed in a set relative position due to magnetic interaction between the magnets, and in the imaging unit is positioned away from the optical unit. In the second mode the units are positioned apart from each other.

20 Claims, 5 Drawing Sheets

(56) References Cited

U.S. PATENT DOCUMENTS

| | | |
|---|---|---|
| 8,699,141 B2 | 4/2014 | Aschwanden et al. |
| 9,106,819 B1 | 8/2015 | Gao et al. |
| 2004/0252987 A1 | 12/2004 | Kobayashi |
| 2008/0165439 A1* | 7/2008 | Chang .................... G02B 7/021 |
| | | 359/822 |
| 2009/0015706 A1 | 1/2009 | Singh |
| 2010/0045855 A1* | 2/2010 | Tanida ................. H04N 5/2252 |
| | | 348/374 |
| 2013/0163980 A1 | 6/2013 | Lazaridis et al. |
| 2014/0063265 A1 | 3/2014 | Shukla et al. |
| 2014/0368711 A1 | 12/2014 | O'Brien |
| 2015/0062422 A1 | 3/2015 | Stern |

OTHER PUBLICATIONS

By, Andre, "Aligning Optics", Published on: Apr. 1, 2011, 6 pages, Available at: http://www.vision-systems.com/articles/print/volume-16/issue-4/features/aligning-optics.html.

* cited by examiner

DEVICE WITH SPLIT IMAGING SYSTEM

BACKGROUND

Digital cameras may be incorporated in various types of mobile devices. Such digital cameras may be used to capture still images and/or videos comprising a plurality of sequential images. One type of mobile devices with digital cameras relates to devices manufactured in more than one part, such as sliding, folding or modular devices. Sliding and folding devices can have more than one camera operating separately or simultaneously.

The quality and properties of the captured images may be affected by use of various types of accessories for a camera. Some accessories may require careful alignment to affect camera performance, for example optical accessories such as lenses and focusing elements.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Electronic devices having a split camera are disclosed. The specification provides implementations of a device with two or more parts and camera elements integrated in at least two of these parts. The device has different working modes depending on the relative position of the camera elements. In the first (working) mode, the camera elements are brought together to work as a camera, aligned and fixed in position by a locking arrangement that includes a movable optical unit and magnets.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

The drawings of the Figures are not necessarily to scale. Like reference numbers are used to designate like parts in the accompanying drawings.

DETAILED DESCRIPTION

The detailed description provided below in connection with the appended drawings is intended as a description of a number of embodiments and is not intended to represent the only forms in which the embodiments may be constructed, implemented, or utilized.

The drawings of the Figures represent the principles of embodiments, especially the structural details, schematically. Structural details of the devices and elements, as well as materials thereof, may be implemented and selected in any appropriate manner. Smaller elements can be illustrated larger for clarity, and the proportions may not be observed.

Among terms used hereinafter, a "camera" refers to a device, module, unit, or element comprising at least an image sensor capable of capturing digital image frames comprising image data, which can be used to reproduce and display digital images. A "camera" may be implemented, for example, as a plain digital image sensor which is connected to appropriate external power supply and control unit(s) and equipped with appropriate housing and an optical system. In another embodiment, a camera may be implemented as an imaging module or camera module which itself may comprise, in addition to the actual digital image sensor element, also any appropriate mechanical and optical elements as well as control electronics.

A "mobile device" may be a mobile electronic device of any type having at least one camera. Such mobile device may be, for example, a tablet computer, a phablet, a smartphone or a mobile phone, a gaming console, a wearable device, etc.

A "magnetic element" may be any element capable of desired interaction with a magnetic field. This term herein covers magnets, ferromagnetic materials, ferrimagnetic materials, antiferromagnets, paramagnetic materials, diamagnetic materials and electromagnets. Where appropriate, paired magnetic elements are elements that are capable of magnetic attraction or repulsion towards each other.

The devices shown in the Figures may be electronic devices, mobile devices, portable and other devices with a camera split in at least two parts defined as an imaging unit 110 and an optical unit 120. Examples of how the camera splits between the body sections will be better understood from the detailed description below. A split camera can be used in split devices with limited body section thickness, especially if a bump on the back plate of the device is undesirable.

Figure 1A:
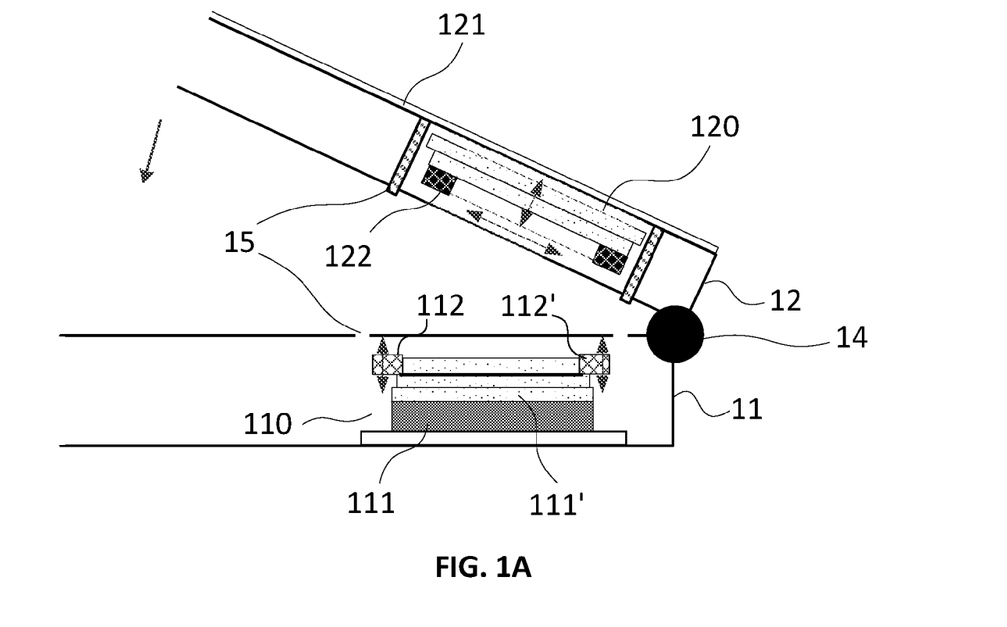
FIG. 1A is a schematic illustration of a foldable device according to an embodiment.

The device in FIG. 1A comprises two body sections 11 and 12. These body sections 11, 12 may each comprise various parts of the device such as electronics, displays, keyboards, wireless modules and others. The body sections 11, 12 are named "first" and "second" for clarity only, and for any set of elements described below in relation to these sections the first and second body sections 11, 12 are interchangeable.

The first body section 11 is in a movable connection with the second body section 12. In an embodiment shown in FIGS. 1A-1B a hinge 14 provides the movable connection, and the device of this embodiment is a foldable device configured to fold about the hinge 14. The hinged 14 foldable connection is described as an example only, and embodiments with other movable connections are also possible, some of them discussed below.

Figure 1B:
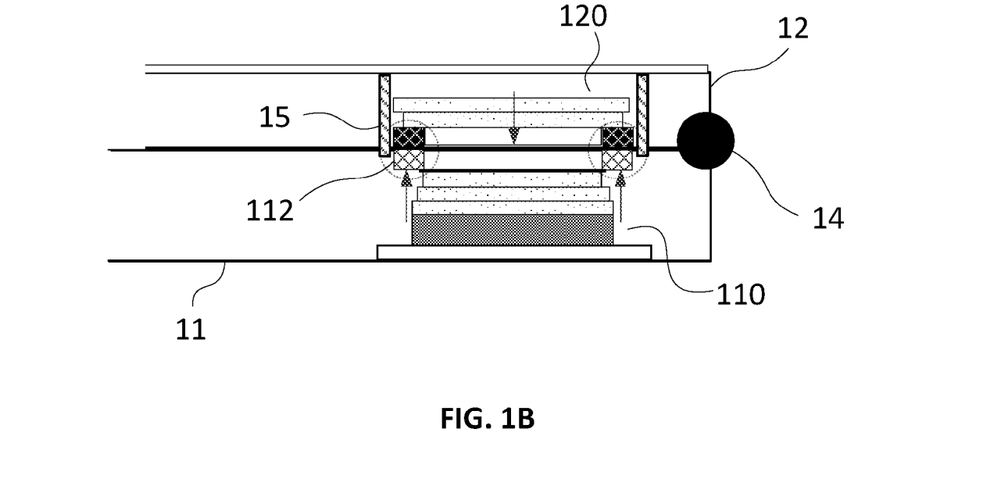
FIG. 1B is a schematic illustration of a folded device according to the embodiment of FIG. 1A.

The first body section 11 comprises an imaging unit 110. The imaging unit 110 is a unit configured to capture images and comprises an image sensor 111. FIGS. 1A-1B also show a stack of other elements in the imaging unit which may comprise, for example, a lens barrel, individual lenses, other optical elements, a substrate, a glass window on the bottom, a connection interface configured to connect the image sensor 111 with other electronics, and other elements. In an embodiment, the imaging unit 110 itself may be an operable digital camera. In an alternative embodiment, the imaging unit is not operable as a camera without the optical unit 120 described further. The first body section 11 also comprises at least one magnetic element 112, 112' in a movable connection with the imaging unit 110. Most Figures in this specification show two movable magnetic elements such as 112 and 112', this is for demonstration purposes only. Any number of magnetic elements may be used in each body section according to embodiments, and the magnetic elements may have any suitable shape including, but not limited to, a ring, a flap, a leaf, a brick etc.

The second body section 12 comprises an optical unit 120. The optical unit 120 comprises at least one additional optical element, illustrated on FIGS. 1A-1B as a stack of three elements for illustration purposes only. The optical unit 120 is positioned to match, with a certain accuracy, the imaging unit 110 when they are brought together by closing the device. The second body section 12 also comprises at least one magnetic element 122 rigidly fixed to the optical unit 120. As with moving magnetic elements 112, 112', the device may comprise any number of magnetic elements in each body section. The optical unit 120 is movable in at least one dimension within a predetermined space, as shown by directional arrows on FIG. 1A. This means that the optical unit 120 is a floating element not fixed rigidly to the rest of the device, and does not exclude that the optical unit 120 may be locked in a predetermined set position under certain circumstances.

The device is operable in at least two modes. In the first mode the first and second body sections 11, 12 are positioned such that the imaging unit 110 and the optical unit 120 are fixed in a set relative position. The set relative position is defined by the relative distance and/or tilt between the imaging unit 110 and the optical unit 120. These parameters remain the same, to a certain degree of accuracy, throughout the use of the device. The fixation is due to magnetic interaction between the at least one magnetic element 112, 112' in a movable connection with the imaging unit 110, and the at least one magnetic element 122 rigidly fixed to the optical unit 120. The first mode is illustrated on FIG. 1B and the magnetic interaction indicated by dotted ovals. The moving parts, i.e. the floating optical unit 120 and the movable magnets 112, 112' are drawn towards each other by magnetic attraction, and this drives the optical unit 120 into a correctly aligned position relative to the imaging unit 110.

The optical unit 120 and the imaging unit 110 are thereby combined to operate as a camera that can capture images through the optical unit 120 onto the image sensor 111. FIG. 1B shows the first mode, and it is a folded mode in this embodiment.

In the second mode the first body section 11 and the second body section 12 are positioned such that the imaging unit 110 is positioned away from the optical unit 120. In the embodiment shown in FIG. 1A the second mode is any unfolded position of the device, including a halfway folded or flat positions. In the second mode, the imaging unit 110 may still be active and capture images onto the image sensor 111 through an aperture (not shown) or transparent part of the casing of the first body section 11. In an embodiment, the second operation mode is an idle mode for the split camera, i.e. for the imaging unit 110 and optical unit 120.

All the movable magnets 112, 112', and in further FIGS. 212, 212', 312, 312', 412, 412' comprised in the first body section 11 or first module 41 are rigidly fixed to each other to avoid unwanted tilt or unpredictable positioning during use of the device.

The split camera provides opportunities to make foldable or sliding or otherwise multi-part devices thinner in the camera region, while maintaining premium quality of the combined camera. The arrangement of magnetic elements disclosed herein has a technical effect of accurate alignment and locking of the relative position of the imaging unit 110 and the optical unit 120. This accuracy also remains throughout repeated activation of the first and second modes of the device, opening and closing of the body sections 11, 12, since magnetic attraction can drive the elements into the same spot with high repeatability.

According to an embodiment, the imaging unit 110 is rigidly fixed to the first body section 11. The movable magnets 112, 112' can therefore are also be in a movable connection in relation to the first body section.

In an embodiment, the imaging unit 110 and the optical unit 120 have optical axes that need to be aligned with a certain degree of accuracy. The set relative position of the units 110, 120 provides such alignment. In an embodiment, one or more mechanical alignment elements 15 are used to connect the body sections 11, 12. As shown on FIGS. 1A-1B, as an example only, the mechanical alignment elements 15 may include pins in the second body section 12 and holes in the first body section 11. This provides the effect of improved horizontal alignment of the optical unit 120 because it negates at least partially the error in alignment caused by mismatching the body sections 11, 12.

In an embodiment, an allowable degree of inaccuracy referred to herein can be outlined by approximately 10-micron positioning accuracy in the vertical dimension, approximately 50-micron positioning accuracy in the horizontal plane and approximately 10-minute tilting accuracy.

In the Figures presented herein, the imaging unit 110 and the optical unit 120 are positioned on the same side of the device as the hinge 14, which leaves less room for misalignment of the units 110, 120. In some devices the hinge 14 or other connecting element is on the opposite side of the device, in which case the mechanical means of fixation and alignment of body sections 11, 12 can be used to greater effect.

The optical unit 120 may include additional passive and/or active optical elements. The passive additional optical elements include one or more additional lenses, optical filters, for example polarization filters, and other elements which affect properties of the resulting image captured by the image sensor 111. For example these properties can be the spectrum, polarization state of light incident on and propagating through the optical element, field of view of the resulting image, colors etc. For example, the optical unit 120 may include a lens which changes the field of view resulting camera, making the pictures more appropriate for scenery shots in the first mode and for portrait or selfie shots in the second mode as a technical effect.

Passive additional optical element do not require the optical unit 120 to be electrically connected to the imaging unit or other elements of the device 10, which reduces the amount of connectors needed. This also provides synergy with magnetic fixation of a position of the optical unit 120, which also does not require an electric connection. A technical effect is that the first and second modes of the device 10 can be activated mechanically without the software or hardware "recognizing" the position of the first and second body sections 11, 12. The first mode can be activated by bringing the body sections 11, 12 together and using the aligned imaging unit 110 and optical unit 120 together as a combined camera, and the second mode can be activated by bringing the body sections 11, 12 apart and using the device in an opened position.

The active additional optical elements comprised in the optical unit 120 are elements which can perform an active function. In an embodiment, the active optical element is a focusing element, for example an autofocus. According to embodiments, the active optical element can also be an image stabilization element or a deformable lens. In order to perform the active function, the optical unit 120 is electrically connected to the imaging unit 110 or a processor and synchronized with the imaging unit 110 in the first mode. The second body section 12 may comprise sufficient space for the optical unit 120 with active additional optical elements to perform lateral or vertical movement of the stabilization elements or autofocus. The optical unit 120 may also comprise a shutter as an active additional optical element. The shutter can be configured to open in the first mode and close in the second mode of the device, or the shutter may be configured to be synchronized with the imaging unit to open only for a period of time necessary to take a picture, in accordance with predetermined exposure time, or to shoot a video.

The device may also comprise protective glass 121 on either side of the body sections 11, 12.

Figure 2A:
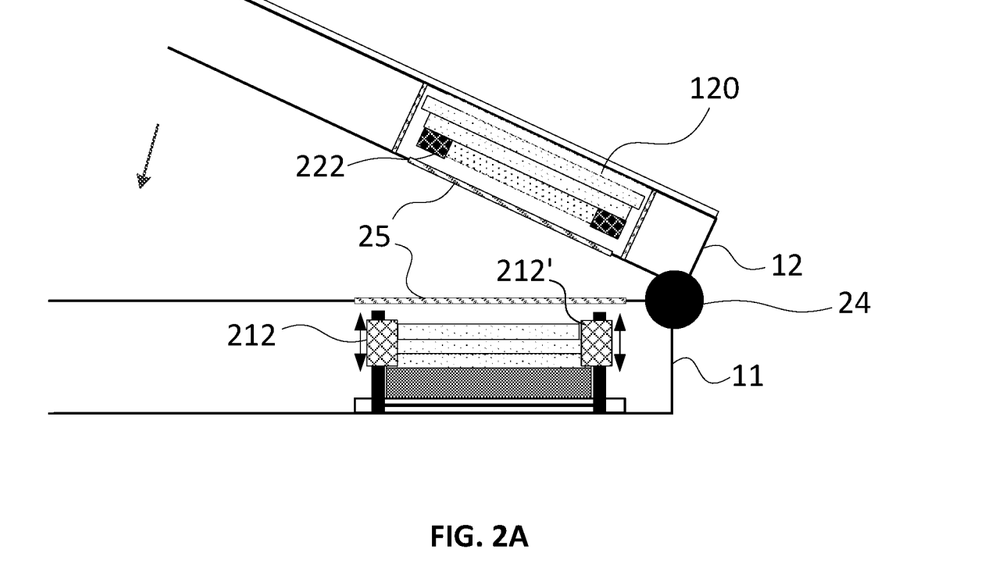
FIG. 2A is a schematic illustration of a foldable device with a guiding element according to an embodiment.
Figure 2B:
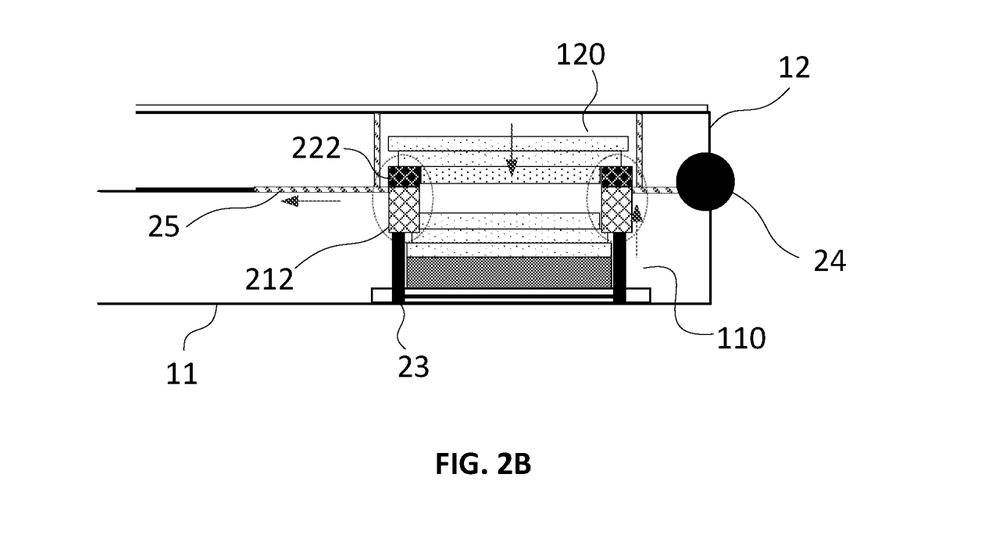
FIG. 2B is a schematic illustration of a folded device according to the embodiment of FIG. 2A.

As shown schematically on FIGS. 2A-2B, in an embodiment the first body section 11 and the second body section 12 each comprise at least one mechanical shutter 25. The mechanical shutters 25 are adapted to expose the imaging unit 110 and the optical unit 120 in the first mode as shown in FIG. 2B; and protect the imaging unit 110 and the optical unit 120 in the second mode, as shown in FIG. 2A.

The device according to any of the described embodiments may comprise a guiding element 23 rigidly fixed to the imaging unit 110. The element 23 provides guided movement to the at least one magnetic element 212, 212' in a movable connection with the imaging unit 110. The magnetic elements 212, 212' are adapted to slide along the guiding element 23, which limits the degree of freedom in movement of the magnetic elements 212, 212'. This provides a technical effect of reliable repeatability of their movement, as well as similar magnetic interactions each time the first mode is activated because the orientation and horizontal position of the magnetic elements 212, 212' remains unchanged. The guiding element 23 may be implemented as one or more rails for the movable magnetic elements.

In an embodiment, the first body section 11 comprises at least one aperture aligned with the magnetic elements 212, 212'. The movable magnetic elements 212, 212' are adapted to move through the at least one aperture towards the second body section 12 in the first mode, and retract into the first body section 11 in the second mode. The second body section 12 may also comprise matching aperture to provide for physical contact between the magnetic elements. In other embodiments, magnetic attraction generated through the material of the window or body sections between the imaging and optical units 110, 120 is sufficient for locking the units in a set position.

In an alternative embodiment, the floating optical unit 120 is adapted to pass move the aperture towards the first body section 11 in the first mode, and retract back into the second body section 12 in the second mode.

According to an embodiment, one or more apertures can be present outside of the area of interface between the optical unit 120 and the imaging unit 110, and the interface may comprise uninterrupted glass or any other transparent material suitable for their combined operation. This isolates the interface of the units 110, 120 by removing the magnetic interaction outside of the area between them in the first mode.

In further embodiments, the mechanical shutters 25 can also be adapted to prevent the movable magnetic elements 212, 212' and optical unit 120 from unwanted outward movement in the second mode by blocking the apertures, and release such movement in the first mode by clearing the apertures. In FIGS. 2A-2B, the whole area of interface between the imaging unit 110 and the optical unit 120 constitutes an aperture. The magnetic elements 212, 212' are adapted to move towards the optical unit 120 along the guiding element 23 through the aperture when the shutter 25 is open. When the magnets 212, 222 are in sufficient proximity to lock with strong magnetic attraction, the units 110 and 120 are fixed in the set relative position.

Figure 3A:
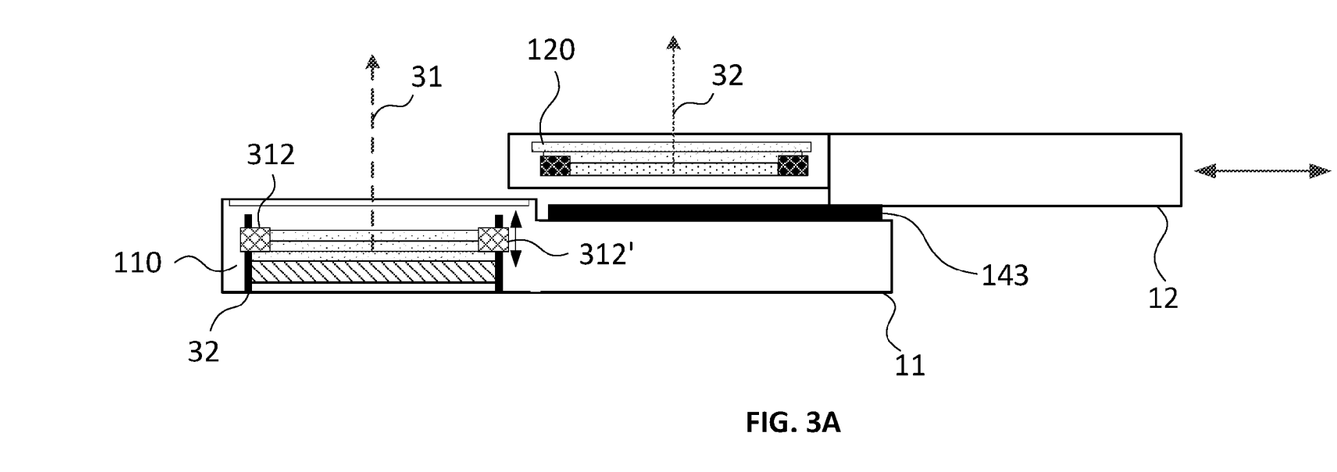
FIG. 3A is a schematic illustration of a sliding device according to an embodiment.
Figure 3B:
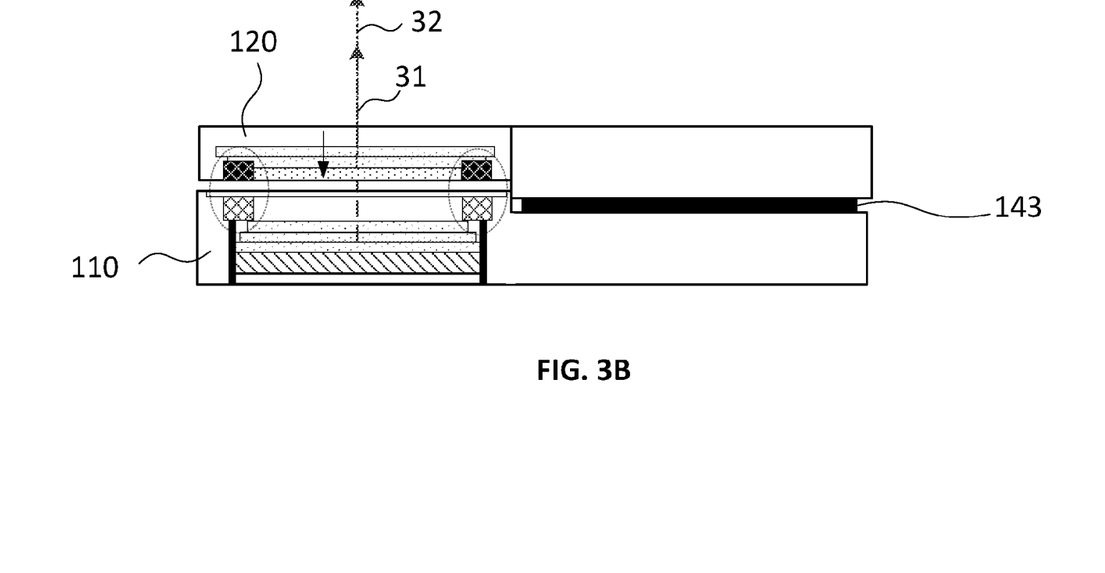
FIG. 3B is a schematic illustration of a closed sliding device according to the embodiment of FIG. 3A.

In FIGS. 3A-3B the device differs from that of FIGS. 1-2 at least in that, instead of a hinge 14, a sliding element 143 is used. The element 143 provides a sliding movable connection between the first body section 11 and the second body section 12, schematically indicated by movement arrows. The first mode of the device, illustrated on FIG. 3B, similarly includes alignment of the optical unit 120 with the imaging unit 110, and the in the second mode they optical unit 120 is positioned away from the imaging unit 110. The modes are activated by sliding of the second body section 12 relative to the first body section 11. In this embodiment, the optical unit 120 can be concealed by the corresponding parts of the first body section 11 and/or the slider in the second mode, or the device may additionally include a mechanical flap to cover the optical unit 120. The shape of the first body section 11 shown in FIGS. 3A-3B matches the shape of the second body section 12 for better alignment of the units 110, 120. This is a variation of mechanical or structural alignment elements that create at least one locked state of the body sections 11, 12. The locked state coincides with the first operation mode of the device, and possibly a second locked state that keeps the device open coincides with the second operation mode. In other embodiments, the shape of the casing of the body sections 11, 12 can be flat or curved or have any other suitable structure. Among technical effects of the sliding arrangement as shown in FIGS. 2A-2B is the ease of implementation of the first and second mode without a need for additional protective elements such as a mechanical flap.

FIGS. 3A-3B also illustrate optical axes 31, 32 of the imaging unit 110 and the optical unit 120. Alignment of the optical axes can be desirable in several embodiments because it allows using stacked optical elements effectively. The set relative position of the units 110, 120 provides alignment of the first optical axis 31 with the second optical axis 32, as illustrated in FIGS. 3A-3B.

Material of the casing of body sections 11, 12 may be any suitable material or combination of materials such as glass, plastic, metal and others. Without regard to the material of the whole casing, all elements and materials of the casing of body sections 11, 12 along the optical axes of the imaging unit 110 and the optical unit 120 are transparent to light. The light can be of appropriate wavelengths so that it can reach the image sensor 111 both in the first mode and in the second mode. The wavelength depends on the type of the image sensor 111, for example for a digital photo camera the image sensor may be sensitive to light of wavelength from approximately 350 nanometers to 1000 nanometers, or to a narrower spectrum between approximately 400 and 700 nanometers. Any subranges are also possible for specific image sensor types.

In an embodiment of a device with a guiding element, the device can also comprise a limiting element attached to the guiding element. The limiting element is adapted to limit the sliding motion of the at least one sliding magnetic element. This provides further control of the position of the magnetic element in the vertical dimension, and can prevent unwanted tilt of the optical unit 120.

The device may be operable in more than two modes according to embodiments. The mode in which the optical unit 120 is exposed and used with the imaging unit 110, and the mode in which the optical unit is concealed and the imagining unit is either idle or functions independently, can be few of a plurality of modes of operation of the device and the imaging unit 110.

According to an embodiment, the device comprises a digital alignment element adapted to monitor the relative position of the imaging unit 110 and the optical unit 120. In the first mode of the device, the digital alignment element additionally adjusts the position of the optical unit 120 such that the imaging unit 110 and the optical unit 120 are fixed in a set relative position. The digital alignment element may comprise a distance measurement element, a misalignment monitoring system, a misalignment compensation system etc. The digital alignment element can be used in addition to the mechanical magnetic alignment according to previous embodiments, and can provide increased accuracy of the alignment of the optical unit 120 in all dimensions.

In the embodiments wherein magnetic elements of the first body section 11 and the second body section 12 come into physical contact in the first mode, the shapes of the magnetic elements can be matched to aid in relative alignment of the units 110, 120. For example, a sloped shape may drive the magnetic element into a right spot, or high friction on one end can provide for a rigid connection. The shape may also include a mechanical locking mechanism which can be unlocked when entering the second operation mode by a use prompt or automatically.

The device may include at least one display attached to any side of the first and second body sections 11, 12.

Figure 4A:
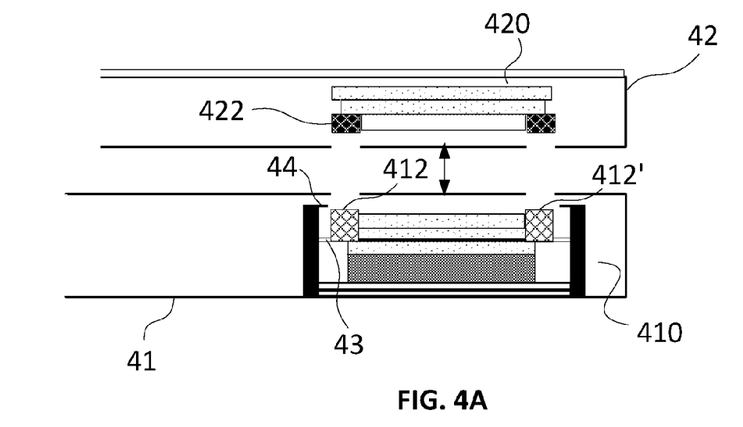
FIG. 4A is a schematic illustration of a system according to an aspect.
Figure 4B:
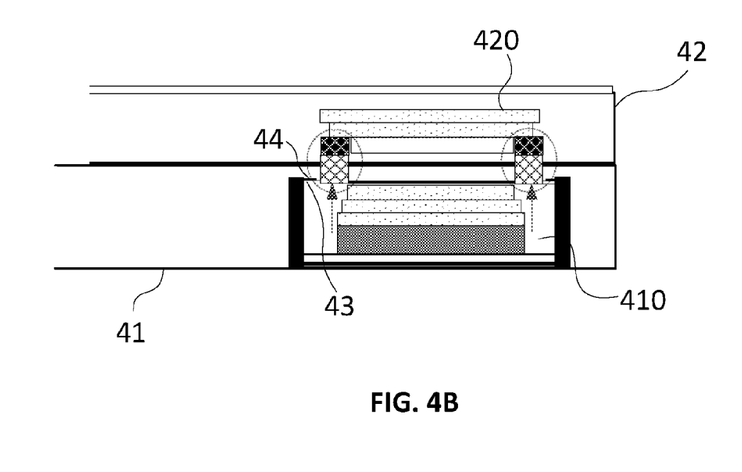
FIG. 4B is a schematic illustration of the system according to the embodiment of FIG. 4A with modules attached.

FIGS. 4*a*-4*b* illustrate a system according to an aspect. The system comprises a first module 41 comprising an imaging unit 410 and at least one magnetic element 412, 412' in a movable connection with the imaging unit 410. The system also comprises a second module 42 comprising an optical unit 420 and at least one magnetic element 422 rigidly fixed to the optical unit. The first module 41 is attachable to the second module 42, and consequently detachable from the second module 42. The optical unit 420 is movable in at least one dimension within a predetermined space in the second module, and when the first module 41 is attached to the second module 42, the imaging unit 410 and the optical unit 420 are fixed in a set relative position due to magnetic interaction of the at least one magnetic element 412, 412' in a movable connection with the imaging unit and the at least one magnetic element 422 rigidly fixed to the optical unit. When the first module is detached from the second module, the imaging unit is positioned away from the optical unit.

The detached mode of the system corresponds to the second mode of the above devices, and the attached mode corresponds to the first mode. The system also illustrates an embodiment wherein a guiding element 44 rigidly fixed to the imaging unit 410 provides sliding motion to the magnets 412, 412'. The guiding element 44 also includes a limiting element 43 adapted to limit the sliding motion of magnets 412, 412' and provides more control over their movement in the vertical dimension. In this example, the apertures are maintained opened and positioned outside of the interface area between the imaging unit 410 and the optical unit 420.

Some or all of the above embodiments have a technical effect of making use of the separate body sections that a foldable, sliding or modular device may have. The split imaging and optical units that can supplement each other when the device is closed operate in synergy with any of the presented structures. The embodiments described herein may be used in combination with any number of additional cameras that the device may have.

Figure 5:
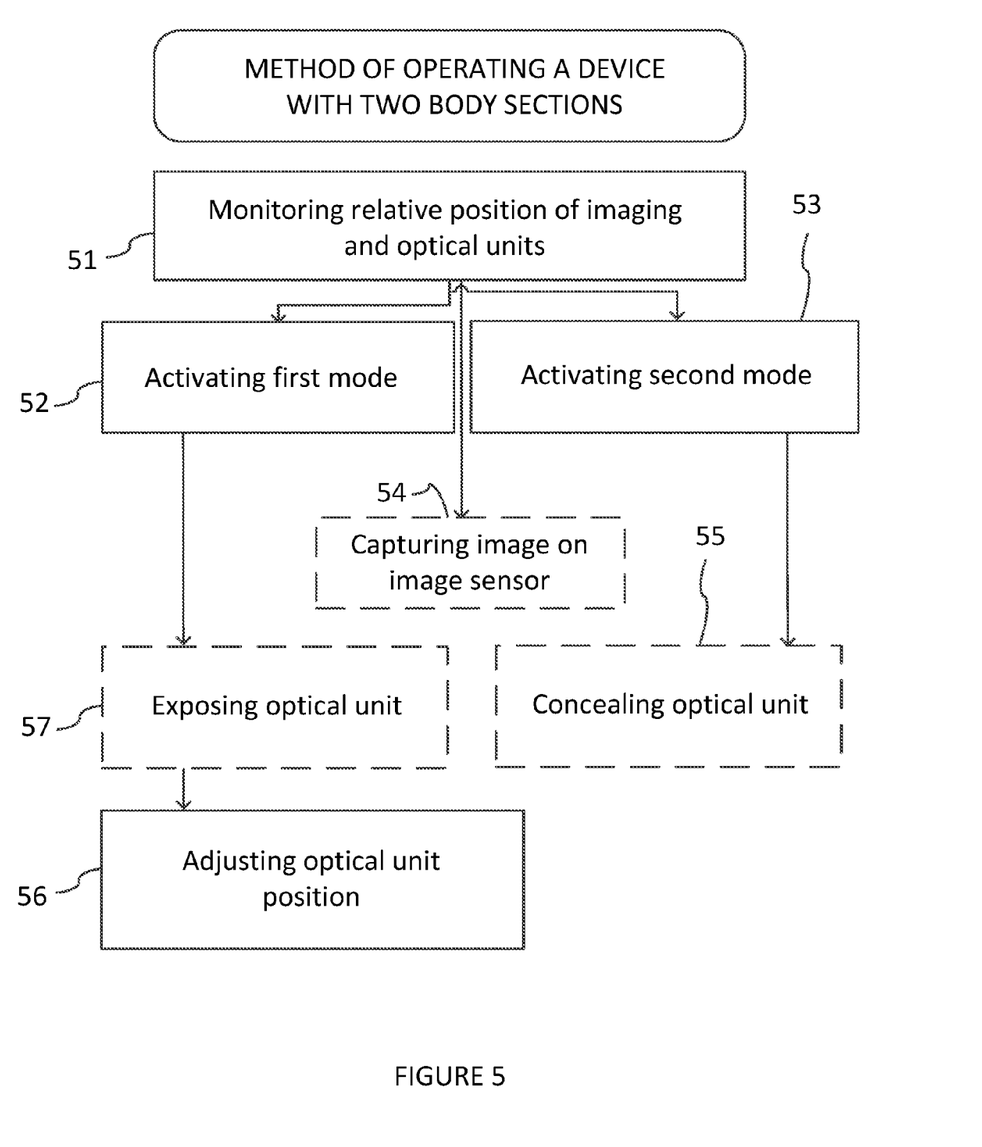
FIG. 5 is a block diagram of a method according to an aspect.

FIG. 5 is a flow chart of a method according to an aspect. It is a method of operating a device comprising a processor; a first body section with an imaging unit and at least one movable magnet, a second body section with an optical unit and at least one magnet rigidly fixed to the optical unit, and a digital alignment element, the first and second body sections being in a movable connection. A controller, a processing unit or a processor of the device can carry out the method. Optional parts of the method are illustrated by boxes with dashed borders.

The method comprises 51 monitoring the relative position of the imaging unit and the optical unit by receiving detections made by the digital alignment element. The detections may be received periodically at a predetermined rate. First mode of the device is activated 52 upon receipt of a detection from the digital alignment element that the imaging unit and the optical unit are brought together. The digital alignment element is then prompted to adjust 56 the position of the optical unit such that the imaging unit and the optical unit are fixed in a set relative position.

A second operation mode of the device is activated 53 upon receipt of a detection from the digital alignment element that the optical unit is positioned away from the imaging unit.

The method may also comprise capturing 54 an image formed on an image sensor of the imaging unit in the first mode of the device or in the second mode of the device, and storing the captured image in a memory. The image capture may be prompted by a command from an image capture control unit, manual image capture interface or image capture software.

In an embodiment, activating 52 the first mode of the device comprises activating a first camera mode in a camera software of the device, and activating 53 the second mode comprises activating a second camera mode in the camera software of the device. The software may have predetermined or user-defined settings for each operation mode, which according to the method activate automatically upon activation of the first and second mode. For example, the software may comprise instructions to activate a scenery mode when the first mode of the device is activated, and activate a portrait or selfie mode when the second mode of the device is activated.

According to an embodiment, the method also comprises exposing 57 the optical unit upon activation of the first mode of the device, and concealing 55 the optical unit upon activation of the second mode of the device. The concealing 55 and exposing 57 may be carried out mechanically or by sending a command to an electric motor configured to move the shutter or flap.

The functionally described features can be performed by a processor, or, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Embodiments are further discussed shortly in the following.

According to a first aspect, a device is presented. The device comprises a first body section comprising an imaging unit and at least one magnetic element in a movable connection with the imaging unit, and a second body section comprising an optical unit and at least one magnetic element rigidly fixed to the optical unit. The first body section is in a movable connection with the second body section, wherein the optical unit is movable in at least one dimension within a predetermined space, and the device is operable in at least two modes. In the first mode the first body section and the second body section are positioned such that the imaging unit and the optical unit are fixed in a set relative position due to magnetic interaction between the at least one magnetic element in a movable connection with the imaging unit and the at least one magnetic element rigidly fixed to the optical unit. In the second mode the first body section and the second body section are positioned such that the imaging unit is positioned away from the optical unit.

In an embodiment, the device comprises a guiding element rigidly fixed to the imaging unit, wherein the at least one magnetic element in a movable connection with the imaging unit is adapted to slide along the guiding element.

In an embodiment, in addition to the above embodiment, the device comprises a limiting element attached to the guiding element, wherein the limiting element is adapted to limit the sliding motion of the at least one magnetic element adapted to slide along the guiding element.

In an embodiment, alternatively or in addition to the above embodiments, the imaging unit is rigidly fixed to the first body section.

In an embodiment, alternatively or in addition to the above embodiments, the imaging unit has a first optical axis; the optical unit has a second optical axis; and in the set relative position the first optical axis is aligned with the second optical axis.

In an embodiment, alternatively or in addition to the above embodiments, the first body section is in a folding movable connection with the second body section; in the first mode the device is folded; and in the second mode the device is unfolded.

In an embodiment, alternatively or in addition to the above embodiments, the comprises a slider, wherein the first body section is in a sliding movable connection with the second body section via the slider.

In an embodiment, alternatively or in addition to the above embodiments, the imaging unit comprises an image sensor and at least one lens.

In an embodiment, alternatively or in addition to the above embodiments, the optical unit comprises at least one additional optical element, and in the first mode the at least one additional optical element and the imaging unit are operable together as a camera with an optical axis In an embodiment, in addition to the above embodiment, at least one additional optical element is a passive optical element selected from the group of: an optical filter and an additional lens.

In an embodiment, in addition to the above embodiment, at least one additional optical element is an active optical element selected from the group of: a stabilization element, a focusing element and a deformable lens; and the optical unit is electrically connected to the imaging unit.

In an embodiment, alternatively or in addition to the above embodiments, the first body section and the second body section each comprise at least one mechanical shutter, wherein the mechanical shutters are adapted to expose the imaging unit and the optical unit in the first mode, and protect the imaging unit and the optical unit in the second mode.

In an embodiment, alternatively or in addition to the above embodiments, the first body section comprises at least one aperture aligned with the at least one magnetic element in a movable connection with the imaging unit. The at least one magnetic element in a movable connection with the imaging unit is adapted to move through the at least one aperture towards the second body section in the first mode, and retract into the first body section in the second mode.

In an embodiment, alternatively or in addition to the above embodiments, the device comprises comprising a digital alignment element adapted to: monitor the relative position of the imaging unit and the optical unit, and, in the first mode of the device, additionally adjust the position of the optical unit such that the imaging unit and the optical unit are fixed in a set relative position.

In an embodiment, alternatively or in addition to the above embodiments, the device comprises at least one display attached to the first body section or the second body section.

According to an aspect, a system is presented. The system comprises a first module comprising an imaging unit and at least one magnetic element in a movable connection with the imaging unit, and a second module comprising an optical unit and at least one magnetic element rigidly fixed to the optical unit. The first module is attachable to the second module, the optical unit is movable in at least one dimension within a predetermined space in the second module, and when the first module is attached to the second module, the imaging unit and the optical unit are fixed in a set relative position due to magnetic interaction of the at least one magnetic element in a movable connection with the imaging unit and the at least one magnetic element rigidly fixed to the optical unit, and when the first module is detached from the second module, the imaging unit is positioned away from the optical unit.

In an embodiment, alternatively or in addition to the above embodiments, the system comprises a guiding element rigidly fixed to the imaging unit, wherein the at least one magnetic element in a movable connection with the imaging unit is adapted to slide along the guiding element.

In an embodiment, alternatively or in addition to the above embodiments, the imaging unit is rigidly fixed to the first module.

According to an aspect, a method is presented. The method is a method for operating a device comprising a processor, a first body section with an imaging unit and at least one movable magnet, a second body section with an optical unit and at least one magnet rigidly fixed to the optical unit, and a digital alignment element, the first and second body sections being in a movable connection. The method comprises monitoring the relative position of the imaging unit and the optical unit by receiving detections made by the digital alignment element, activating a first mode of the device upon receipt of a detection from the digital alignment element that the imaging unit and the optical unit are brought together, prompting the digital alignment element to adjust the position of the optical unit such that the imaging unit and the optical unit are fixed in a set relative position, and activating a second mode of the device upon receipt of a detection from the digital alignment element that the optical unit is positioned away from the imaging unit In an embodiment, the method comprises exposing the optical unit upon activation of the first mode of the device, and concealing the optical unit upon activation of the second mode of the device.

Although some of the present embodiments may be described and illustrated herein as being implemented in a smartphone, a mobile camera, or a tablet computer, these are only examples of a device and not a limitation. As those skilled in the art will appreciate, the present embodiments are suitable for application in a variety of different types of mobile devices such as game consoles or game controllers, various wearable devices, portable cameras and others.

Although the subject matter has been described in language specific to structural features and/or methodological acts, it is to be understood that the subject matter defined in the appended claims is not necessarily limited to the specific features or acts described above. Rather, the specific features and acts described above are disclosed as exemplary forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The embodiments illustrated and described herein as well as embodiments not specifically described herein but within the scope of aspects of the invention constitute exemplary means for operating a device with a split camera. For example, the elements illustrated and described with reference to FIGS. 1A-4B, when configured to perform the operations illustrated and described with reference to FIG. 5, constitute exemplary means for monitoring the relative position of the imaging unit and the optical unit by receiving detections made by the digital alignment element, exemplary means for activating a first mode of the device upon receipt of a detection from the digital alignment element that the imaging unit and the optical unit are brought together, exemplary means for prompting the digital alignment element to adjust the position of the optical unit such that the imaging unit and the optical unit are fixed in a set relative position, and exemplary means for activating a second mode of the device upon receipt of a detection from the digital alignment element that the optical unit is positioned away from the imaging unit.

The term "comprising" is used in this specification to mean including the features followed thereafter, without excluding the presence of one or more additional features.

The invention claimed is:

1. A device comprising:
a first body section comprising an imaging unit and at least one magnetic element in a movable connection with the imaging unit, and
a second body section comprising an optical unit and at least one magnetic element rigidly fixed to the optical unit,
wherein:
the first body section is in a movable connection with the second body section,
the optical unit is movable in at least one dimension within a predetermined space, and
the device is operable in at least two modes:
in the first mode the first body section and the second body section are positioned such that the imaging unit and the optical unit are fixed in a set relative position due to magnetic interaction between the at least one magnetic element in a movable connection with the imaging unit and the at least one magnetic element rigidly fixed to the optical unit, and
in the second mode the first body section and the second body section are positioned such that the imaging unit is positioned away from the optical unit.

2. A device as claimed in claim 1 comprising a guiding element rigidly fixed to the imaging unit, wherein the at least one magnetic element in a movable connection with the imaging unit is adapted to slide along the guiding element.

3. A device as claimed in claim 2 comprising a limiting element attached to the guiding element, wherein the limiting element is adapted to limit the sliding motion of the at least one magnetic element adapted to slide along the guiding element.

4. A device as defined in claim 1, wherein the imaging unit is rigidly fixed to the first body section.

5. A device as defined in claim 1, wherein the imaging unit has a first optical axis; the optical unit has a second optical axis; and in the set relative position the first optical axis is aligned with the second optical axis.

6. A device as defined in claim 1 comprising a hinge, wherein the first body section is in a folding movable connection with the second body section; in the first mode the device is folded; and in the second mode the device is unfolded.

7. A device as defined in claim 1, comprising a slider, wherein the first body section is in a sliding movable connection with the second body section via the slider.

8. A device as defined in claim 1, wherein the imaging unit comprises an image sensor and at least one lens.

9. A device as defined in claim 1, wherein
the optical unit comprises at least one additional optical element, and
in the first mode the at least one additional optical element and the imaging unit are operable together as a camera with an optical axis.

10. A device as defined in claim 9, wherein at least one additional optical element is a passive optical element selected from the group of: an optical filter and an additional lens.

11. A device as defined in claim 9, wherein
at least one additional optical element is an active optical element selected from the group of: a stabilization element, a focusing element and a deformable lens; and
the optical unit is electrically connected to the imaging unit.

12. A device as defined in claim 1, wherein the first body section and the second body section each comprise at least one mechanical shutter, wherein the mechanical shutters are adapted to expose the imaging unit and the optical unit in the first mode, and protect the imaging unit and the optical unit in the second mode.

13. A device as defined in claim 1, wherein the first body section comprises at least one aperture aligned with the at least one magnetic element in a movable connection with the imaging unit, and the at least one magnetic element in a movable connection with the imaging unit is adapted to move through the at least one aperture towards the second body section in the first mode, and retract into the first body section in the second mode.

14. A device as defined in claim 1, comprising a digital alignment element adapted to: monitor the relative position of the imaging unit and the optical unit, and, in the first mode of the device, additionally adjust the position of the optical unit such that the imaging unit and the optical unit are fixed in a set relative position.

15. A device as defined in claim 1, comprising at least one display attached to the first body section or the second body section.

16. A system, comprising:
a first module comprising an imaging unit and at least one magnetic element in a movable connection with the imaging unit, and
a second module comprising an optical unit and at least one magnetic element rigidly fixed to the optical unit, wherein:
the first module is attachable to the second module,
the optical unit is movable in at least one dimension within a predetermined space in the second module, and
when the first module is attached to the second module, the imaging unit and the optical unit are fixed in a set relative position due to magnetic interaction of the at least one magnetic element in a movable connection with the imaging unit and the at least one magnetic element rigidly fixed to the optical unit, and
when the first module is detached from the second module, the imaging unit is positioned away from the optical unit.

17. A system as defined in claim 16 comprising a guiding element rigidly fixed to the imaging unit, wherein the at least one magnetic element in a movable connection with the imaging unit is adapted to slide along the guiding element.

18. A system as defined in claim 16, wherein the imaging unit is rigidly fixed to the first module.

19. A method of operating a device comprising a processor, a first body section with an imaging unit and at least one movable magnet, a second body section with an optical unit and at least one magnet rigidly fixed to the optical unit, and a digital alignment element, the first and second body sections being in a movable connection; the method comprising:
monitoring the relative position of the imaging unit and the optical unit by receiving detections made by the digital alignment element,
activating a first mode of the device upon receipt of a detection from the digital alignment element that the imaging unit and the optical unit are brought together,
prompting the digital alignment element to adjust the position of the optical unit such that the imaging unit and the optical unit are fixed in a set relative position, and
activating a second mode of the device upon receipt of a detection from the digital alignment element that the optical unit is positioned away from the imaging unit.

20. A method as defined in claim 19, comprising exposing the optical unit upon activation of the first mode of the device, and concealing the optical unit upon activation of the second mode of the device.

* * * * *